(12) United States Patent
Goodfriend

(10) Patent No.: US 6,824,388 B2
(45) Date of Patent: Nov. 30, 2004

(54) STRONG AND WEAK VOWEL METHOD OF TEACHING READING

(76) Inventor: Sheila Goodfriend, 14907 Claude La., Silver Spring, MD (US) 20905

( * ) Notice: Subject to any disclaimer, the term of this patent is extended or adjusted under 35 U.S.C. 154(b) by 0 days.

(21) Appl. No.: 10/701,872

(22) Filed: Nov. 5, 2003

(65) Prior Publication Data

US 2004/0115598 A1 Jun. 17, 2004

Related U.S. Application Data

(60) Provisional application No. 60/424,047, filed on Nov. 5, 2002.

(51) Int. Cl.[7] ............................................... G09B 17/00
(52) U.S. Cl. ....................................................... 434/178
(58) Field of Search ................................ 434/156, 157, 434/167, 169, 178, 185

(56) References Cited

U.S. PATENT DOCUMENTS

| | | | | |
|---|---|---|---|---|
| 3,426,451 A | * | 2/1969 | Hoffmann | 434/178 |
| 4,030,211 A | * | 6/1977 | McGinley | 434/167 |
| 4,078,319 A | | 3/1978 | Mazeski et al. | |
| 4,193,212 A | * | 3/1980 | Al-Kufaishi | 434/178 |
| 4,437,837 A | * | 3/1984 | Schnettler et al. | 434/178 |
| 4,490,118 A | | 12/1984 | Stewart | |
| 4,655,713 A | * | 4/1987 | Weiss | 434/178 |
| 5,057,020 A | * | 10/1991 | Cytanovich | 434/178 |
| 5,197,883 A | | 3/1993 | Johnston | |
| 5,567,159 A | | 10/1996 | Tehan | |
| 6,077,080 A | | 6/2000 | Rai | |
| 6,126,447 A | * | 10/2000 | Engelbrite | 434/167 |
| 6,358,059 B1 | * | 3/2002 | Li | 434/402 |
| 2002/0094511 A1 | | 7/2002 | Li | |
| 2002/0119429 A1 | | 8/2002 | Barton | |

OTHER PUBLICATIONS

Knutsson, Peter; "Word Stress: Weak and Strong Vowels"; Autumn 2002 www.hi.is/~peturk/KENNSLA/02/TOP/stress1.html.
Parvin, Bob; "Tutoring for Mastery; Part 2: Writing". www.sfo.com/~parvin/part2.html.
Bett, Steve; "Simple Spel" Spelling on the Net: Mar. 2002 www.uniforn.org/ssn-mar02.htm.
Mora,Jill Kerper; "Metalinguistic Transfer in Spanish/English Biliteracy"; Jul. 26, 2002; San Diego State University. www.unifon.org/alphabet-def.htm; Alphabet Report.

* cited by examiner

*Primary Examiner*—Kurt Fernstrom
(74) *Attorney, Agent, or Firm*—Law Offices of Royal W. Craig

(57) ABSTRACT

A method and system for teaching reading to children and adults with or without learning disabilities. The reading teaching method and system employs a strong boy and a weak boy character to respectively represent the strong and weak vowel sounds, most commonly referred to as the long and short vowel sounds. The strong boy holds a straight barbell over his head to represent the strong (long) vowel sound and the weak boy holds a sagging barbell over his head to represent the weak (short) vowel symbol. The association of the strong boy to the strong vowel and the weak boy to the weak vowel and the overall strong boy/weak boy concept are applied to decoding words and learning to read.

19 Claims, 8 Drawing Sheets

Strong Vowels

ā  āpe

31 ↓
When a is strong, a says his own name *ā* as in *āpe*!

ē  ēar

32 ↓
When e is strong, e says his own name *ē* as in *ēar*!

ī  ice

33 ↓
When i is strong, i says his own name *ī* as in *ice*!

ō  ōak tree

34 ↓
When o is strong, o says his own name *ō* as in *ōak*!

ū  mūle

35 ↓
When u is strong, u says his own name *ū* as in *mūle*!

Steps to Decode Strong Vowel Words

| | |
|---|---|
| 300→  | Frame the word with your hands. |
| 310→  | Cover every letter before the vowel with your finger. If there are 2 vowels in the word, then the magic "e" gives all the power to the other vowel. |
|  320 | Magic "e" gives all the power to a so a is strong and says ā! ā with nnn is āne! |
| 330→  | Put on ppp and you get pāne! |

STRONG AND WEAK VOWEL METHOD OF TEACHING READING

CROSS-REFERENCE TO RELATED APPLICATIONS

The present application derives priority from U.S. Provisional Patent Application 60/424,047 for "STRONG AND WEAK VOWEL METHOD OF TEACHING READING", filed Nov. 5, 2002.

BACKGROUND OF THE INVENTION

1. Field of the Invention

The present invention relates to reading and teaching methods, and more particularly to a method of teaching reading which changes the ambiguous terms "long" and "short" vowels to a particular associative vowel imagery set to symbolize the strong and weak vowel sounds, respectively, thus allowing the reader to formulate a visual and cognitive understanding of the written words.

2. Description of the Background

Reading and literacy are essential elements of a child's education. However, learning to read English is a difficult hurdle to overcome. This is due, in part, to the many nuances in the English written word. Some children, as well as many adults, have an additional difficulty learning to read, either because of learning disabilities, such as dyslexia, or short attention spans, or simply lack of interest. Thus, many reading teaching methods have been developed which employ different techniques to achieve the same goal of successfully teaching a student to read. These methods include the simple techniques to the more complex that use a number of props and/or outside stimuli to aid in the teaching process.

Concepts associated with reading teaching methods incorporating interpretation of vowel sounds, the use of symbols or other indicators to represent vowel sounds, and/or word framing techniques are well-known in the prior art. For example, U.S. Pat. No. 4,490,118 to Stewart, U.S. Pat. No. 6,077,080 to Rai, U.S. Pat. No. 5,197,883 to Johnston, Li's U.S. patent application Ser. No. 2002/0094511, "Word Stress: Weak and Strong Vowels" Phonetics I—Autumn 2002 Course Outline by Petur Knutsson, "Tutoring For Mastery: Part 2—Writing", "Simple Spel"—a Newsletter of the simplified Spelling Society, Metalinguistic Transfer in Spanish/English Biliteracy by Jill Kerper Mora of San Diego State University, and "Alfabet Report" each teach a method incorporating a variation of interpretation of vowel sounds to aid in the teaching of reading. Some of these methods also show an interpretation of "strong" and "weak" vowel sounds. For example, "Word Stress: Weak and Strong Vowels" Phonetics I—Autumn 2002 Course Outline by Petur Knutsson and "Tutoring For Mastery: Part 2—Writing" each use a variation of an interpretation of strong vowels occurring in stressed syllables and weak syllables occurring in unstressed syllables. On the other hand, Metalinguistic Transfer in Spanish/English Biliteracy by Jill Kerper Mora of San Diego State University shows a method that defines weak vowels as "i, u" and strong vowels as "a, e, o".

Other prior art uses symbols, characters, or other indicators to represent vowel sounds. For example, U.S. Pat. No. 4,490,118 to Stewart uses a series of codes (e.g., V, CV, VC, CVC) to identify vowel and syllable patterns. U.S. Pat. No. 6,077,080 to Rai uses colors to represent root sounds of vowels or consonants, and symbols to represent various altering sounds depending upon the placement of the symbol in reference to the letter. U.S. Pat. No. 5,567,159 to Tehan uses unique colors and characteristics to differentiate different vowels and consonants. U.S. Pat. No. 4,655,713 to Weiss uses non-pictorial short-stroke symbols of various contrasts in color, intensity, and typestyle to represent the sound of letter combinations.

Two other prior art methods incorporate a word frame technique to focus the reader on components of the word when sounding it out. U.S. Pat. No. 5,197,883 to Mazeski, et al. incorporates an apparatus which allows the reader to focus on a word or letter group within a narrow lateral span, which gradually increases. Baton's U.S. patent application Ser. No. 2002/0119429 incorporates a word frame to allow the reader to view words in isolation.

While these and other methods employ various visual tools to aid the reader in learning to read, they do not employ associative visual imagery to connote vowel-sounds. Specifically, they do not use strong and weak graphical images to represent long and short vowel sounds. This particular method, using the strong and weak boys as base imagery for the long and short vowel sounds, enables a student to overcome difficulties in reading and become a successful reader. The terms "long" and "short" sounds have a meaningless connotation for children.

SUMMARY OF THE INVENTION

It is, therefore, an object of the present invention to provide a reading teaching method and system which allows all children to read independently.

It is another object to provide a reading teaching method and system that uses decoding as a multi-sensory approach by specific auditory, tactile, and visual means.

It is another object to provide a reading teaching method and system that provides the reader with a visual and cognitive understanding.

It is another object to provide a reading teaching method and system that allows regular education and learning disabled children to successfully learn to read.

It is still another object to provide a reading teaching method and system that readers can easily relate to and understand.

These and other objects are accomplished by the present invention, which is a revolutionary method and system for teaching reading to children and adults, learning disabled and not, whereby each individual can become a successful reader. The teaching method employs the strong vowel represented by the graphic image of a character of a strong, muscular boy holding a barbell straight over his head, and the weak vowel represented by the graphic image of a smaller, weak, skinny boy holding a sagging barbell over his head. The straight barbell of the strong boy relates to the mark over the strong vowels and the sagging barbell of the weak boy relates to the scooped mark over the weak vowels. Students learn that each vowel has two names . . . a very strong name and a very weak name. For example, students are taught that when the letter a is strong, the strong boy says his own name $\bar{a}$ as in $\bar{a}$pe (the macron or short horizontal dash over the vowel denotes that the vowel is strong or "long" in the traditional sense). When the letter a is weak, the weak boy says ăăă as in ăăapple (the breve or crescent over the vowel denotes that the vowel is weak or "short" in the traditional sense). The students are taught graphic associations with the strong and weak boy. These strong and weak boy associations replace the traditional long and short vowel concept, which, without visualization, may be meaningless to a student learning to read, particularly if the student is learning disabled. These strong and weak boy models are associated with their strong and weak vowel counterparts to decode words.

More specifically, the method and system includes a lesson plan with specific topics scheduled over the course of the learning period, which is generally thirty-five weeks. First, the instructor teaches the consonants and their sounds and introduces the strong and weak characters. Second, the instructor teaches each of the weak vowels separately, devoting an entire week to each weak vowel sound . . . "a", "e", "i", "o", and "u". Next, the instructor will teach the strong vowel words beginning with the magic "e" vowel words with each magic "e" encompassing an entire week. The magic "e" endings include a__e, i__e, o__e, and u__e. Students are taught that the magic "e" at the end of the word gives all the power to the vowel, so the vowel is strong and says his own name. Finally, the instructor will teach vowel combinations and the concept of "when two vowels go walking, the first one does the talking." These vowel combinations include ee, ea, oa, and ai. The "talking" means the vowel is strong and says his own strong name. For example, students are taught that in ai vowel combination, i gives all the power to a, so a says his own name ā! Each lesson includes a review of the prior lessons so that the progress is cumulative and by the end of the final lesson, the reader is usually ready to move on to more complex reading concepts.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is an unique approach to teaching reading which enables moderately paced and special needs children to decode words independently and successfully. The reading method and system generally employs "associative imagery", e.g., a technique by which visual imagery is relied upon to impose (and eventually ingrain) the proper language association. Specifically, a strong boy character 1 (see FIG. 2) is used to represent strong vowel sounds and a weak boy character 2 (see also FIG. 2) to represent the weak vowel sounds. Historically, the terms "long" and "short" vowels have been used to teach a student how to read. However, the long and short connotations have no meaning to the student because there is no inherent visualization, and are therefore not easily grasped, understood, and followed. In accordance with the present invention, the "strong" and "weak" vowels replace the "long" and "short" vowels, respectively. The reader now has a visual representation that he or she can associate with the various vowel sounds. The present method and system does not include some of the other traditional reading instruction techniques, such as memorizing chunks or endings of words, sight vocabulary and flashcards. Memorizing chunks of words, reliance on sight vocabulary, and reliance on flashcards are anxiety producing for children, particularly those with learning disabilities. The associative imagery method allows a child to read well over 1,200 words in the first grade reading component, which is significantly more than the 700–900 words achieved using other traditional decoding methods. Children acquire confidence in decoding a word independently without guessing. Focusing on the "strong vowel boy" and the "weak vowel boy" promotes self esteem and pride in the reader, allowing him or her to achieve the goal of reading.

Figure 1:
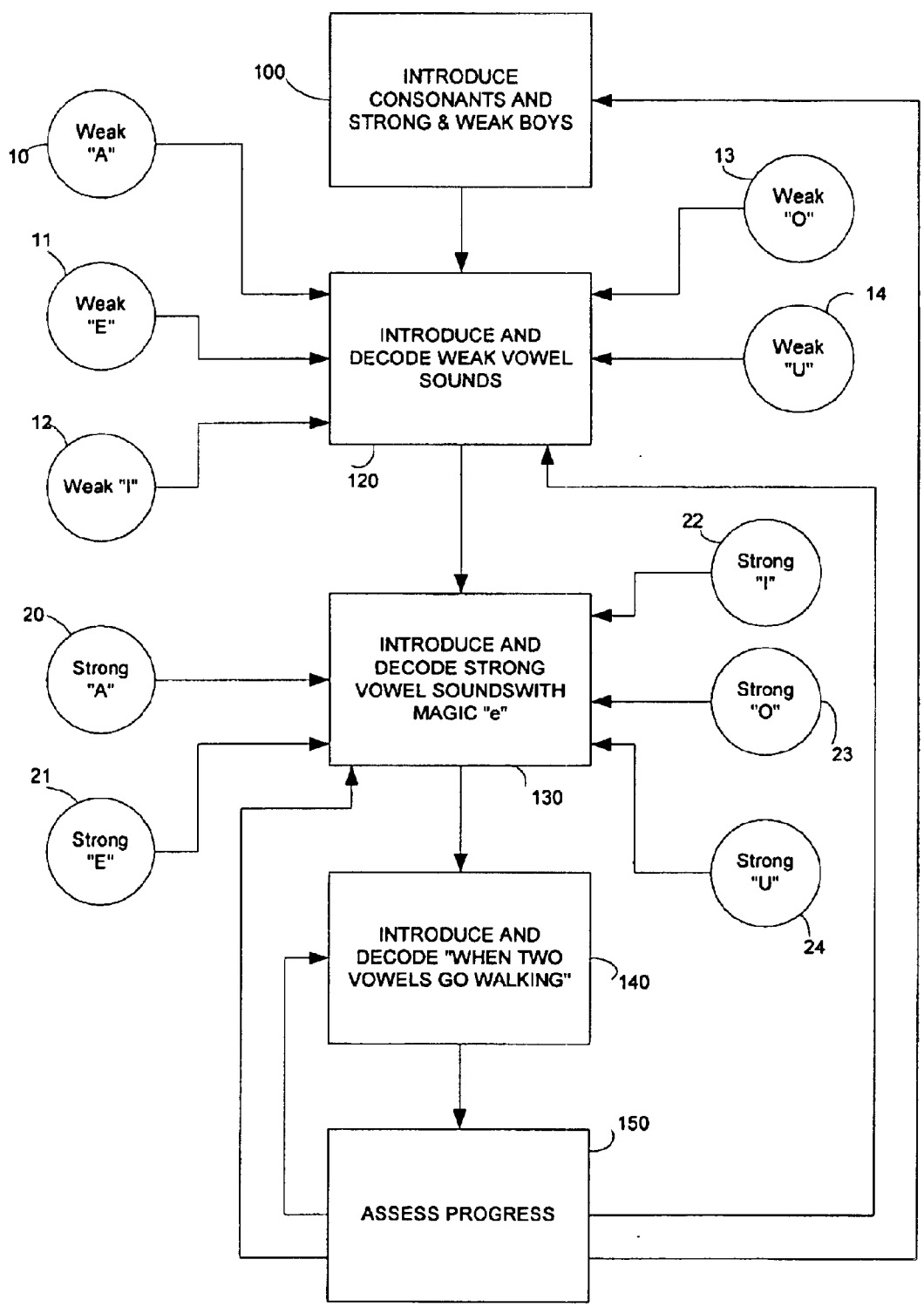
FIG. 1 is a flow diagram of the reading teaching method according to the present invention.

FIG. 1 is a flow diagram of the associative imagery reading teaching method according to the present invention. At Step 100 the instructor introduces consonants and consonant sounds. The instructor teaches that consonants generally have only one sound (with some exceptions, such as the letter "C"), but that all vowels have at least two sounds, a strong and a weak sound. This "strong" and "weak" connotation is taught consistently and reinforced through visual imagery whereby the student associates graphical "strong" and "weak" images with strong and weak vowel sounds. This strong and weak graphic imagery has no inherent association with vowel sounds, yet provides the reader with a meaningful mental connection between the graphic imagery and vowel sounds. For example, a strong boy character 1 is represented by a strong, burly, muscled boy holding a barbell high and straight over his head. The straight barbell is the same symbol as the straight line ("‾") placed over a vowel to signify a strong vowel sound. A weak boy character 2 is represented by a small, weak, skinny boy barely holding a sagging barbell over his head. This sagging barbell is the same symbol as the scooped mark ("˘") over a vowel to signify a weak vowel sound.

At Step 120, the instructor teaches the association of the weak graphic imagery with the associated weak vowel sounds. This step also includes decoding words using the weak boy connotation. Decoding involves taking a word and breaking it down into smaller components so that the student learns the individual components and then puts them back together to build the word. In the present invention, decoding is accomplished through the association of the visual graphic strong and weak imagery with the strong and weak vowel sounds. The instructor associates the weak boy character 2 with the weak vowel sounds in individual words and employs other visual aids, such as pictures of the object of the word being decoded, to help the reader decode each word. The decoding process is described in greater detail below with respect FIG. 5. Each weak vowel 10, 11, 12, 13, and 14 is introduced separately and an entire week of lessons is devoted to each vowel. As a new weak vowel is introduced, the weak vowels from prior weeks' lessons are reviewed. Each new weak vowel sound becomes a building block that enables the reader to achieve reading cognition. By the time the instructor completes the week's lesson on the last weak vowel, the student has repetitively decoded all weak vowels and, through the graphic imagery, is able to independently read words with weak vowel sounds. Once the instructor has completed the lessons on weak vowels, the reader is ready to progress to the strong vowel sounds of magic "e" at Step 130. The instructor introduces the association of the strong boy character 1 to the associated strong vowel sounds and teaches the student how to decode strong vowel words, using the graphic imagery and other visual aids. Magic "e" gives all the power to a so a is strong and says his own name a as in "gate". As with the weak vowels of Step 120, each strong vowel with magic "e" . . . 20, 21, 22, 23, and 24 is introduced separately with an entire week's lesson devoted to each vowel. The strong vowel sounds are a_e, i_e, o_e, and u_e. At the end of the sessions on strong vowels with magic "e", the reader is able to independently read words with strong and weak vowels.

Figure 8:
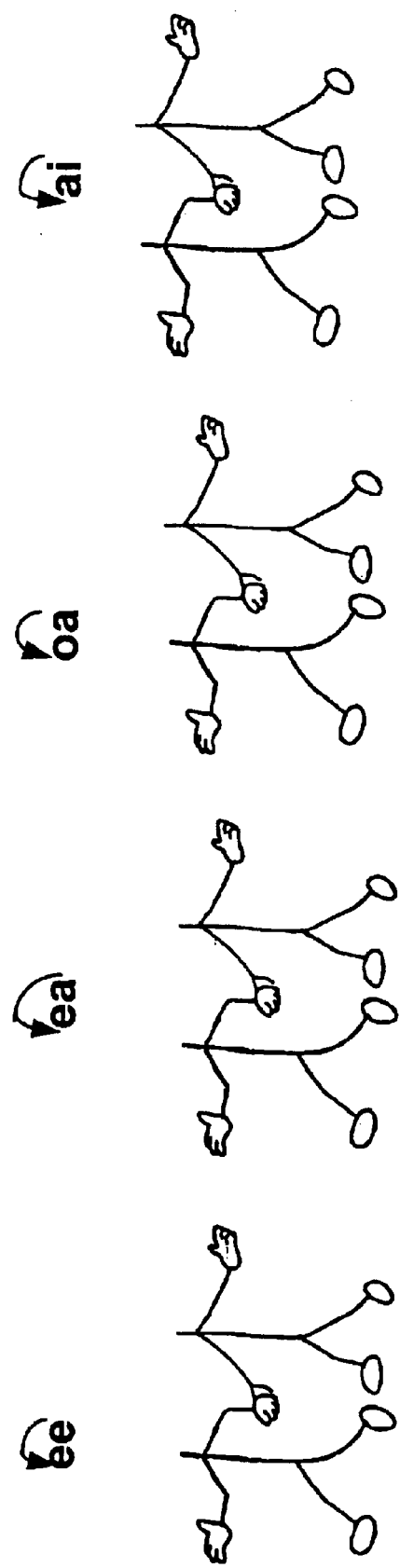
FIG. 8 shows the concept of "when two vowels go walking, the first one does the talking."

At Step 140 the instructor introduces the traditional concept of "when two vowels go walking, the first one usually does the talking". This concept, when associated with the strong and weak boys, can now be visualized by the reader. Through the visual imagery of the strong and weak characters and other graphic images, students are taught that if there are two vowels in a word, one gives the other "power" so he is "strong" and says his own name. The concept of "when two vowels go walking . . . " is not new. However, the present invention provides a method to teach this traditional concept using cognitive associations of graphic imagery with vowel sounds. Specific examples of "When two vowels go walking, the first one does the talking" are . . . ai, oa, ee, ea, as shown in FIG. 8. These associations helps to provide the student with a connotation that makes sense, whereby they can relate the strong graphic imagery to some of the nuances of reading English.

At Step 150, the instructor assesses the progress of the student. This assessment is performed at each lesson along the way where the instructor provides feedback and positive reinforcement to the student, with a final assessment at the end of each week.

Figure 2:
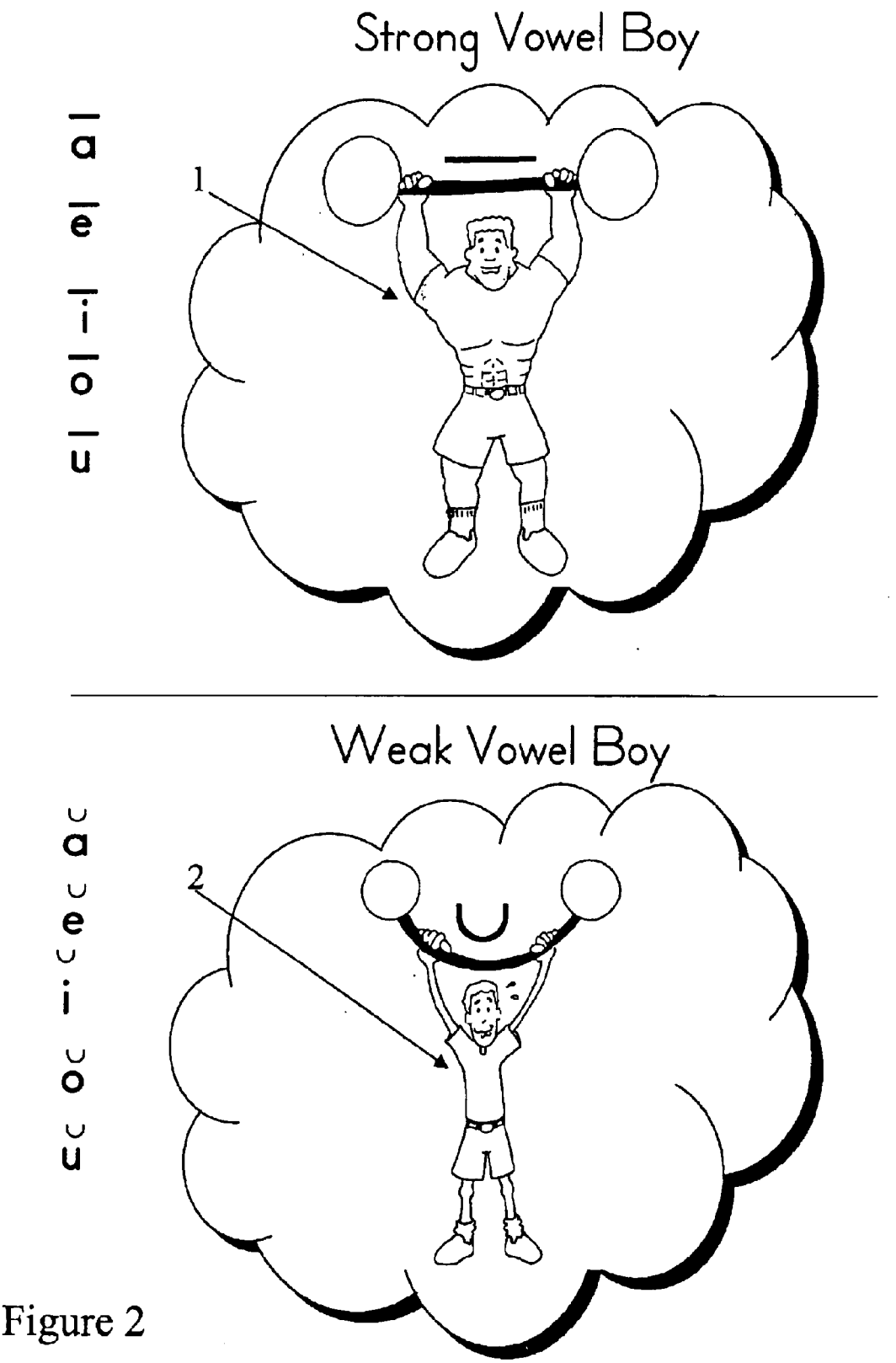
FIG. 2 shows the strong and weak boy characters 1, 2, respectively.

FIG. 2 shows the graphic imagery of the strong and weak boy characters 1, 2, respectively. The strong boy character 1 is a strong, muscled, burly boy with a barbell held high and straight over his head. The symbol of the strong straight barbell is the same symbol as the line ("") over the strong vowel. The weak boy character 2 is a small skinny boy barely holding a sagging barbell over his head. The symbol of the sagging barbell is the same as the scooped line ("") over a weak vowel. The student is taught to associate the strong boy barbell 1 to the strong symbol of the strong vowel and the weak boy barbell 2 to the weak symbol of the weak vowel. This association forms the basis for the reading method.

Figure 3:
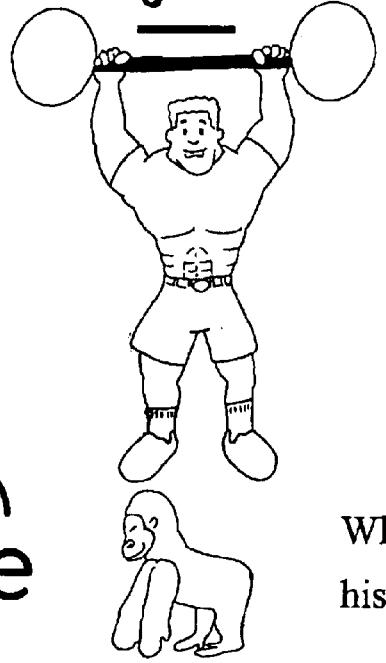
FIG. 3 shows exemplary words 31–35 with strong vowels using the strong boy character 1.
Figure 3:
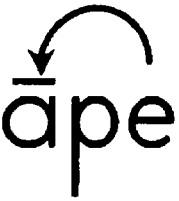
Figure 3:
Figure 3:
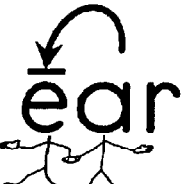
Figure 3:
Figure 3:
Figure 3:
Figure 3:
Figure 3:
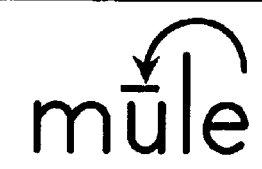
Figure 3:
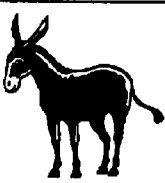

FIG. 3 shows exemplary words with strong vowels using the strong boy character 1. The straight line of the strong boy's barbell is placed over the vowel to denote a strong vowel sound, such as the "a" in ape 31, the "e" in ear 32, the "i" in ice 33, the "o" in oak 34, and the "u" in mule 35. The instructor employs this association of the graphic imagery of the strong boy 1 with many different graphic images of words to enable the reader to independently make the strong vowel association.

Figure 4:
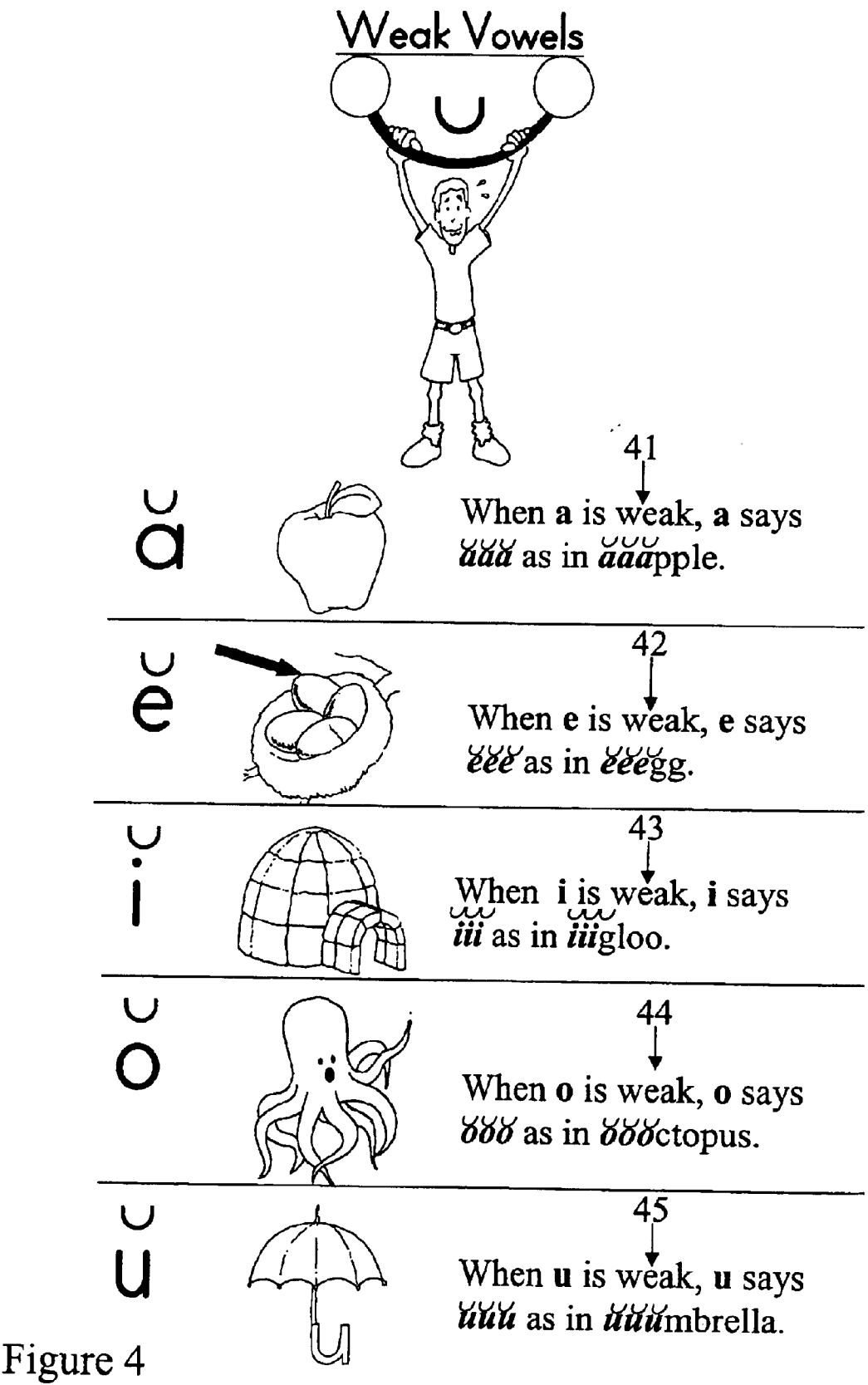
FIG. 4 shows exemplary words 41–45 with weak vowels using the weak boy character 2.

FIG. 4 shows exemplary words with weak vowels using the weak boy character 2. The sagging line of the weak boy's barbell is placed over the vowel to denote a weak vowel sound, such as the "a" in apple 41, the "e" in egg 42, the "i" in igloo 43, the "o" in octopus 44, and the "u" in umbrella 45. As with the strong vowels, the instructor employs this association of the graphic imagery of the weak boy 2 with many different graphic images of words to enable the reader to independently make the weak vowel association.

Figure 5:
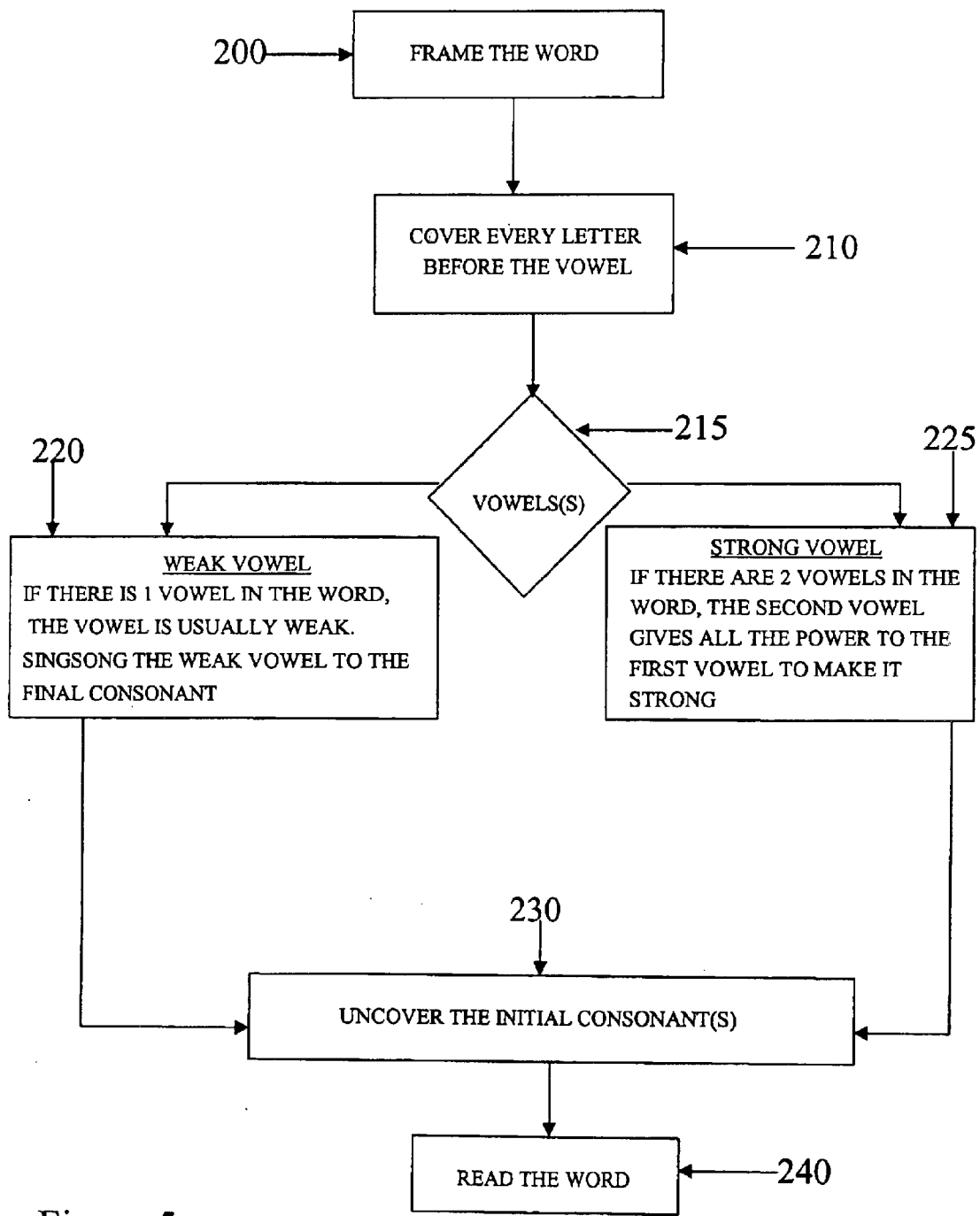
FIG. 5 is a flow diagram of the decoding steps 200–240 of the reading teaching method according to the present invention.
Figure 6:
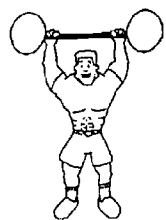
FIG. 6 shows a sample word decoding using the strong boy character 1.
Figure 6:
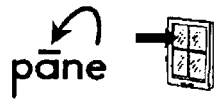
Figure 6:
Figure 6:
Figure 6:
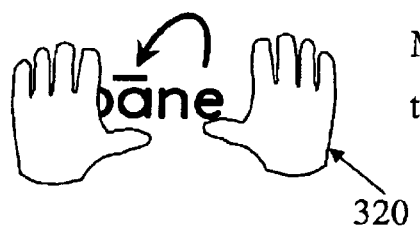
Figure 6:
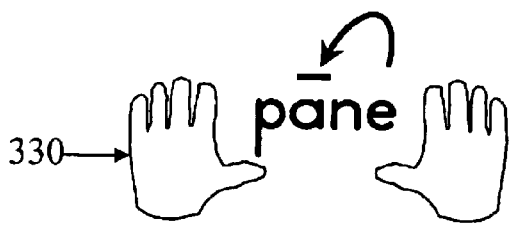
Figure 7:
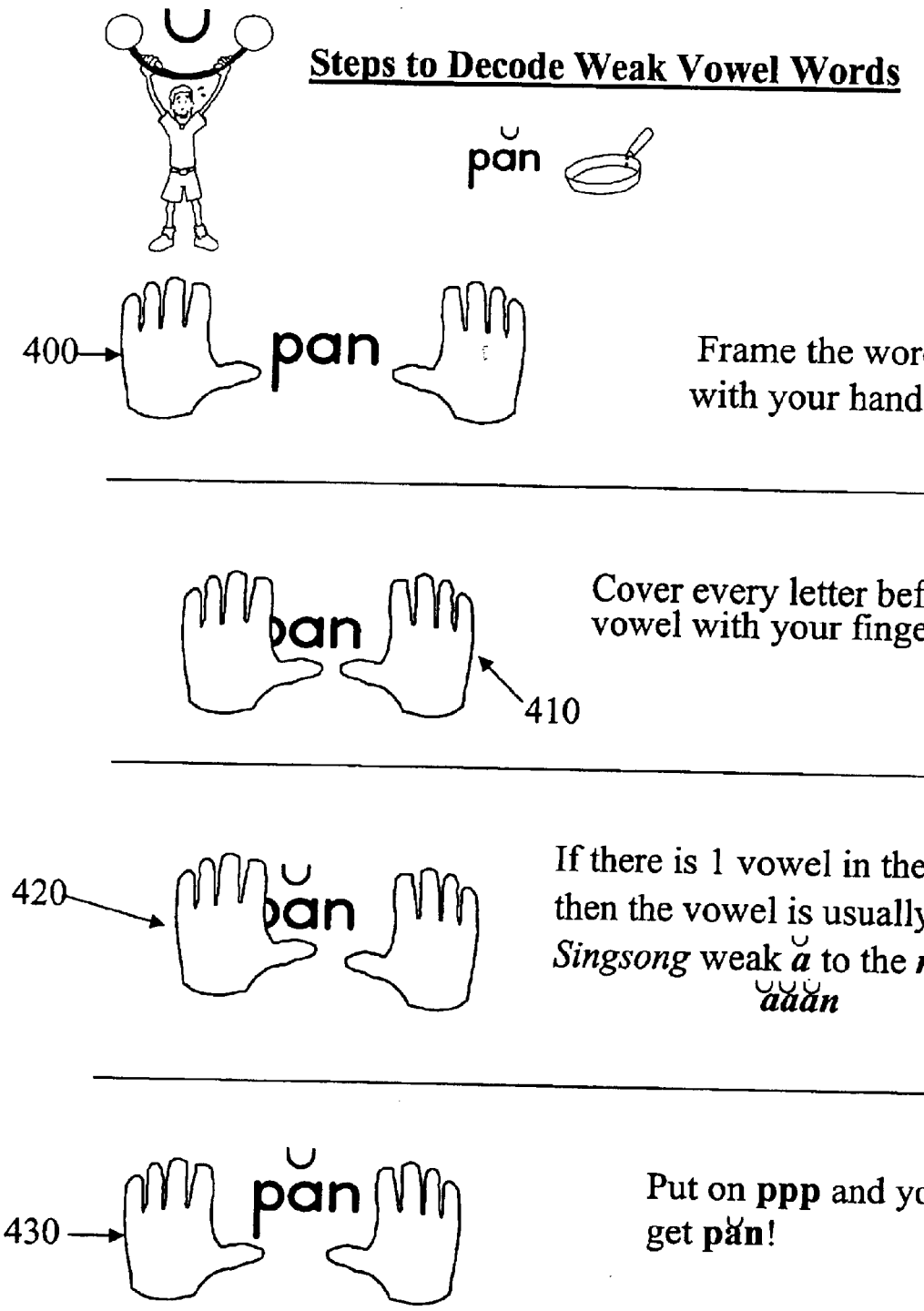
FIG. 7 shows a sample word decoding using the weak boy character 2.

FIG. 5 is a flow diagram of the decoding process associated with the reading teaching method and system according to the present invention. Exemplary word decodings are shown in FIG. 6 and FIG. 7. The process of decoding parses a word into its base components and then builds the word from the components. Decoding in the present invention applies the graphic imagery to the strong and weak vowels. Decoding begins at Step 200 where the student is asked to frame a particular word with his or her hands. Framing involves placing the hands on either side of the word to be read so that the only word in the reader's line of sight is the particular word to be read.

At Step 210, the reader is asked to cover every letter of the word before the vowel with his or her left index finger. This leaves the vowel(s) and any subsequent consonants displayed. At 215 a decision is made as to whether the word contains one or more vowels.

If the subject word contains only one vowel, the reader is taught that vowel is usually weak. At Step 220 the student is asked to associate the weak boy graphic image (with the sagging barbell over his head) with the weak mark over the weak vowel and to singsong the weak vowel with the following consonant sound. Singsonging the weak vowel sound with the following consonant allows the reader to recognize the sound of the vowel. At Step 230, the instructor prompts the reader to remove his or her left index finger to uncover the initial consonant(s). The reader is then prompted at Step 240 to add on the initial consonant sound(s) to the weak sound of Step 220 to read aloud the subject word.

If, at Step 215, the subject word contains two vowels, the reader is taught, as indicated in Steps 130 and 140 of FIG. 1, that the first vowel is usually strong. At Step 225 the student is asked to associate the strong boy graphic image (with the straight barbell over his head) with the strong mark over the strong, or first, vowel and to read aloud the strong vowel with the following consonant sound. Reading the strong vowel sound with the following consonant allows the reader to recognize the sound of the vowel. At Step 230, the instructor prompts the reader to remove his or her left index finger to uncover the initial consonant(s). The reader is then prompted at Step 240 to add on the initial consonant sound(s) to the strong sound of Step 225 to read aloud the subject word.

FIG. 6 shows a sample word decoding using the strong boy character symbol 1. The word being decoded is "pane". The reader is presented with the written word and a picture of the object of the word, in this case a window pane. The reader is then asked to frame the word with his or her hands, at Step 300, by placing a hand on either side of the word so that only the subject word is displayed. At Step 310, the reader is asked to cover every letter before the vowel with his or her left index finger. If there are two vowels in the word with a magic "e" at the end of the word, the reader is taught that magic "e" gives all the power to the first vowel so the first vowel is strong and says his own name. This decoding technique stresses the association of the "strong boy" graphic image 1 to the concept of strong vowels. At Step 320, the reader is taught that the magic "e" at the end of the word gives all the power to "a" so "a" is strong and says his own name "a". The instructor then tells the student that a strong "a" with "nnn" (the sound of the letter 'n') is "ane", with the straight line over the "a" as with the straight barbell over the strong boy's head. Reading the vowel and following consonant aloud enables the reader to recognize the sound of the vowel. Finally, at Step 330, the instructor tells the student to remove his or her left index finger from the initial consonant(s) and to read the word in its entirety, in this case, adding the initial consonant "p", which creates the word "pane".

FIG. 7 shows a sample word decoding using the weak boy character symbol 2. The word being decoded is "pan". The reader is presented with the written word and a picture of the object of the word, in this case a frying pan. As in FIG. 6, the reader is asked to frame the word with his or her hands, at Step 400, by placing a hand on either side of the word so that only the subject word is displayed. At Step 410, the reader is asked to cover every letter before the vowel with his or her left index finger. The reader is taught that if there is one vowel in the word, the vowel is usually weak. At Step 420, the reader is taught to singsong a weak "a" to the "nnn" (sound of the letter 'n') . . . "aaan", with the scooped line over the "a" as with the scooped or sagging barbell over the weak boy's head. Finally, at Step 430, the instructor tells the student to remove his or her left index finger from the initial consonant(s) and to read the word in its entirety, in this case, adding the initial "p" to the front of "aaan", which creates "pan".

FIG. 8 shows the concept of "when two vowels go walking, the first one does the talking."

The above-described associative imagery method for teaching reading is highly effective with children and adults, learning disabled and not, and allows each individual to become a successful reader. The method emphasizes and utilizes a multi-sensory approach of tactile, auditory, verbal, and visual techniques, and it provides the reader with a visual and cognitive understanding that does not result from present techniques.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

What is claimed is:

1. A method for teaching reading, comprising the steps of:
   presenting a plurality of consonants to a student;
   associating a sound with each of said plurality of consonants;
   presenting a plurality of vowels to said student;
   associating a first sound and a second sound with each of said plurality of vowels, said first sound being a weak vowel sound and said second sound being a strong vowel sound;
   presenting a first character depicted as weak to said student;
   imparting an association to said student between said first character and said first sound for each of said plurality of vowels, such that said student uses said first character to decode words containing said first sound for one of said plurality of vowels;
   presenting a second character depicted as strong to said student;
   imparting an association to said student between said second character and said second sound for each of said plurality of vowels, such that said student uses said second character to decode words containing said second sound for one of said plurality of vowels; and
   assessing the progress of said student.

2. The method according to claim 1, further comprising the steps of;
   presenting first and second concepts associated with words containing first and second vowels to said student;
   imparting an association to said student between said second character and said second sound with said first vowel in words containing first and second vowels; and
   using said first and second concepts to decode words containing first and second vowels.

3. The method according to claim 2, wherein said step of using said second character to decode words further comprises the step of presenting a plurality of lessons, each of said plurality of lessons being devoted to said second sound associated with each of said plurality of vowels.

4. The method according to claim 3, wherein said step of presenting a plurality of lessons further comprises the steps of;
   framing a word containing first and second vowels with the hands of said student;
   covering each consonant appearing in said word prior to said first vowel with the left index finger of said student;
   associating said second character with said first vowel in said word;
   reading aloud, by said student, said first vowel in combination with the sound associated with the consonant immediately following said first vowel;
   moving said student's left index finger to uncover each consonant appearing in said word prior to said first vowel; and
   reading aloud, by said student, said word by adding the sound associated with each consonant appearing in said word prior to said first vowel to the sound of said first vowel in combination with the sound associated with the consonant immediately following said first vowel.

5. The method according to claim 1, wherein said step of using said first character to decode words further comprises the step of presenting a plurality of first lessons, each of said plurality of first lessons being devoted to said first sound associated with each of said plurality of vowels.

6. The method according to claim 5, wherein said step of presenting a plurality of lessons further comprises the steps of;
   framing a word containing a vowel with the hands of said student;
   covering each consonant appearing in said word prior to said vowel with the left index finger of said student;
   associating said first character with said vowel in said word;
   singsonging aloud, by said student, said vowel in combination with the sound associated with the consonant immediately following said vowel;
   moving said student's left index finger to uncover each consonant appearing in said word prior to said vowel; and
   reading aloud, by said student, said word by adding the sound associated with each consonant appearing in said word prior to said vowel to the sound of said vowel in combination with the sound associated with the consonant immediately following said vowel.

7. The method according to claim 1, wherein said step of using said second character to decode words further comprises the step of presenting a plurality of second lessons, each of said plurality of second lessons being devoted to said second sound associated with each of said plurality of vowels.

8. The method according to claim 7, wherein said step of presenting a plurality of lessons further comprises the steps of;

framing a word containing a vowel with the hands of said student;

covering each consonant appearing in said word prior to said vowel with the left index finger of said student;

associating said second character with said vowel in said word;

reading aloud, by said student, said vowel in combination with the sound associated with the consonant immediately following said vowel;

moving said student's left index finger to uncover each consonant appearing in said word prior to said vowel; and reading aloud, by said student, said word by adding the sound associated with each consonant appearing in said word prior to said vowel to the sound of said vowel in combination with the sound associated with the consonant immediately following said vowel.

9. An article of manufacture to assist in teaching reading comprising printed materials including graphic images, said graphic images including;

a first character to be associated with weak vowel sounds;

a second character to be associated with strong vowel sounds;

a plurality of words; and said printed materials including instructions for decoding each of said plurality of words using said first and second characters.

10. The article of manufacture according to claim 9, wherein said first character is depicted as a small, skinny boy barely holding a sagging barbell over his head.

11. The article of manufacture according to claim 9, wherein said second character is depicted as a strong, muscled, burly boy with a barbell held high and straight over his head.

12. The article of manufacture according to claim 9, wherein each of said graphic word images is accompanied by a drawing or picture of that represented by said word.

13. A method for teaching reading, comprising the steps of:

presenting a plurality of consonants to a student;

associating a sound with each of said plurality of consonants;

presenting a plurality of vowels to said student;

associating a first sound and a second sound with each of said plurality of vowels, said first sound being a weak vowel sound and said second sound being a strong vowel sound;

presenting a first character depicted as weak to said student;

imparting an association to said student between said first character and said first sound for each of said plurality of vowels, such that said student uses said first character to decode words containing said first sound for one of said plurality of vowels;

presenting a second character depicted as strong to said student;

imparting an association to said student between said second character and said second sound for each of said plurality of vowels, such that said student uses said second character to decode words containing said second sound for one of said plurality of vowels;

presenting first and second concepts associated with words containing first and second vowels to said student;

imparting an association to said student between said second character and said second sound with said first vowel in words containing first and second vowels;

using said first and second concepts to decode words containing first and second vowels, wherein said step of using said first and second concepts to decode words further comprising the step of;

presenting a plurality of third and fourth lessons, each of said plurality of third and fourth lessons being devoted to said second sound associated with each of said plurality of vowels, wherein said step of presenting a plurality of third and fourth lessons further comprising the steps of;

framing a word containing first and second vowels with the hands of said student;

covering each consonant appearing in said word prior to said first vowel with the left index finger of said student;

associating said second character with said first vowel in said word;

reading aloud, by said student, said first vowel in combination with the sound associated with the consonant immediately following said first vowel;

moving said student's left index finger to uncover each consonant appearing in said word prior to said first vowel; and reading aloud, by said student, said word by adding the sound associated with each consonant appearing in said word prior to said first vowel to the sound of said first vowel in combination with the sound associated with the consonant immediately following said first vowel; and assessing the progress of said student.

14. The method according to claim 13, wherein said step of imparting an association to said student between said first character and said first sound for each of said plurality of vowels further comprises the step of;

presenting a plurality of first lessons, each of said plurality of first lessons being devoted to said first sound associated with each of said plurality of vowels, wherein said step of presenting a plurality of first lessons further comprising the steps of;

framing a word containing a vowel with the hands of said student;

covering each consonant appearing in said word prior to said vowel with the left index finger of said student;

associating said first character with said vowel in said word;

singsonging aloud, by said student, said vowel in combination with the sound associated with the consonant immediately following said vowel;

moving said student's left index finger to uncover each consonant appearing in said word prior to said vowel; and reading aloud, by said student, said word by adding the sound associated with each consonant appearing in said word prior to said vowel to the sound of said vowel in combination with the sound associated with the consonant immediately following said vowel.

15. The method according to claim 13, wherein said step of imparting an association to said student between said second character and said second sound for each of said plurality of vowels further comprises the step of;

presenting a plurality of second lessons, each of said plurality of second lessons being devoted to said second sound associated with each of said plurality of vowels, wherein said step of presenting a plurality of second lessons further comprising the steps of;
framing a word containing a vowel with the hands of said student;
covering each consonant appearing in said word prior to said vowel with the left index finger of said student;
associating said second character with said vowel in said word;
reading aloud, by said student, said vowel in combination with the sound associated with the consonant immediately following said vowel;
moving said student's left index finger to uncover each consonant appearing in said word prior to said vowel; and
reading aloud, by said student, said word by adding the sound associated with each consonant appearing in said word prior to said vowel to the sound of said vowel in combination with the sound associated with the consonant immediately following said vowel.

16. A system for teaching reading, comprising:
a graphic image of a first character associated with weak vowel sounds, wherein said first character is depicted as a small, skinny boy barely holding a sagging barbell over his head;
a graphic image of a second character;
a plurality of graphic images of words; and
a plurality of lesson plans.

17. The system according to claim 16, wherein said second character is associated with strong vowel sounds and is depicted as a strong, muscled, burly boy with a barbell held high and straight over his head.

18. An article of manufacture to assist in teaching reading comprising printed materials bearing graphic images, said graphic images including;
a first character associated with weak vowel sounds, wherein said first character is depicted as a small, skinny boy barely holding a sagging barbell over his head;
a second character;
a plurality of words; and
a set of instructions containing a listing of steps to be used in decoding each of said plurality of words using said first and second characters.

19. The article of manufacture according to claim 18, wherein said second character is associated with strong vowel sounds and is depicted as a strong, muscled, burly boy with a barbell held high and straight over his head.

* * * * *